United States Patent [19]

Crowther

[11] Patent Number: 4,864,614

[45] Date of Patent: Sep. 5, 1989

[54] AUTHORISING CODED SIGNALS

[75] Inventor: Gerald O. Crowther, Sutton, United Kingdom

[73] Assignee: U.S. Philips Corporation, New York, N.Y.

[21] Appl. No.: 243,245

[22] Filed: Sep. 8, 1988

[30] Foreign Application Priority Data

Jul. 15, 1983 [GB] United Kingdom ............. 8319133

[51] Int. Cl.⁴ ............................................. H04L 9/00
[52] U.S. Cl. ..................................... 380/10; 380/20; 380/21
[58] Field of Search .................. 380/10, 20, 21, 23, 380/25; 340/825.34

[56] References Cited

U.S. PATENT DOCUMENTS

| | | | |
|---|---|---|---|
| 4,161,751 | 7/1979 | Ost | 380/20 |
| 4,268,859 | 5/1981 | Ost | 358/122 |
| 4,292,650 | 9/1981 | Hendrickson | 380/20 |
| 4,369,443 | 1/1983 | Giallanza et al. | 340/825.47 |
| 4,475,123 | 10/1984 | Dumbald et al. | 380/20 |
| 4,494,142 | 1/1985 | Mistry | 380/20 |
| 4,531,020 | 7/1985 | Wechselberger et al. | 178/22.08 |
| 4,558,464 | 12/1985 | O'Brien, Jr. | 380/20 |
| 4,563,702 | 1/1986 | Heller et al. | 358/119 |
| 4,577,224 | 5/1986 | Ost | 380/20 |
| 4,694,491 | 9/1987 | Horne et al. | 380/20 |
| 4,736,422 | 4/1988 | Mason | 380/20 |
| 4,739,510 | 4/1988 | Jeffers et al. | 380/20 |

Primary Examiner—Salvatore Cangialosi
Attorney, Agent, or Firm—Michael E. Marion

[57] ABSTRACT

In a transmission system authorization codes are transmitted to authorize subscribers to receive scrambled signals in an intelligible manner, such a system being a television transmission system. If each subscriber were assigned a unique authorization code an extremely long period of time would be required to transmit these codes for a national broadcast system. With the present arrangement, the authorizing code includes a multi-bit binary code word (18,20) which is unique to a group of subscribers, this code word being followed by a train of binary pulses (19',19";21', 21",) the number of pulses in the train being not less than the number of subscribers in the group. Each subscriber is allocated a unique pulse position in the pulse train (19',19";21',21",) at which position the state of the pulse either authorizes or inhibits the subscriber from receiving the scrambled signal intelligibly.

14 Claims, 3 Drawing Sheets

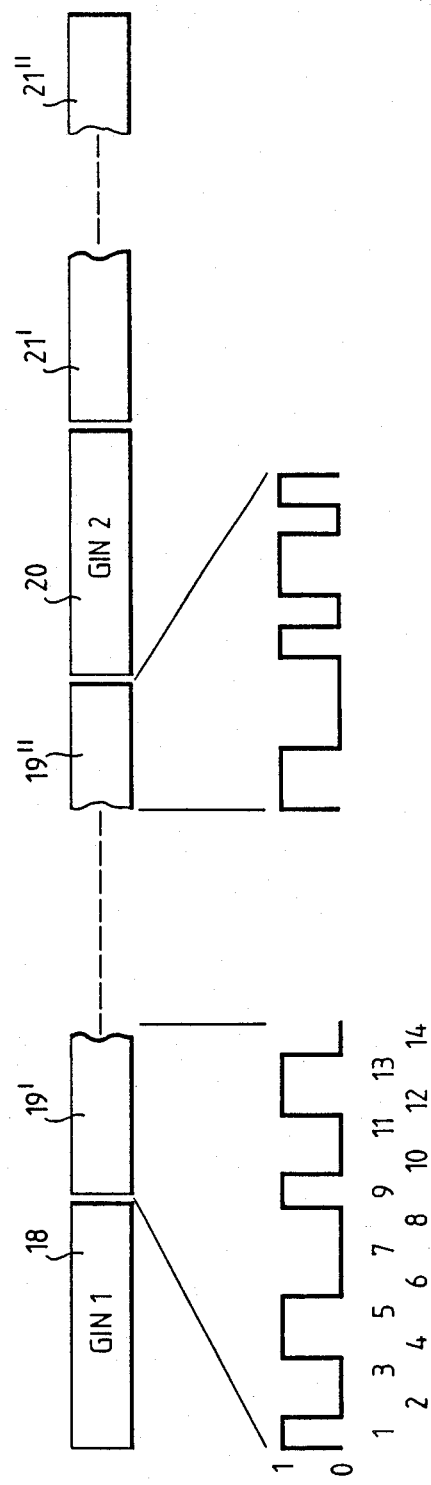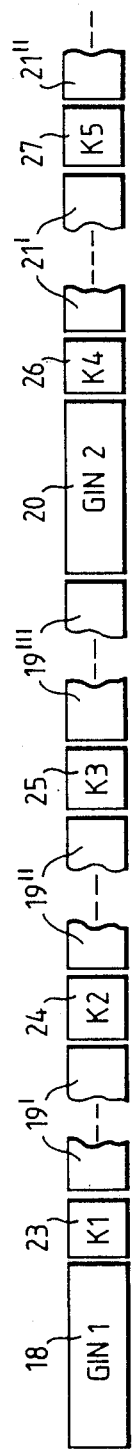

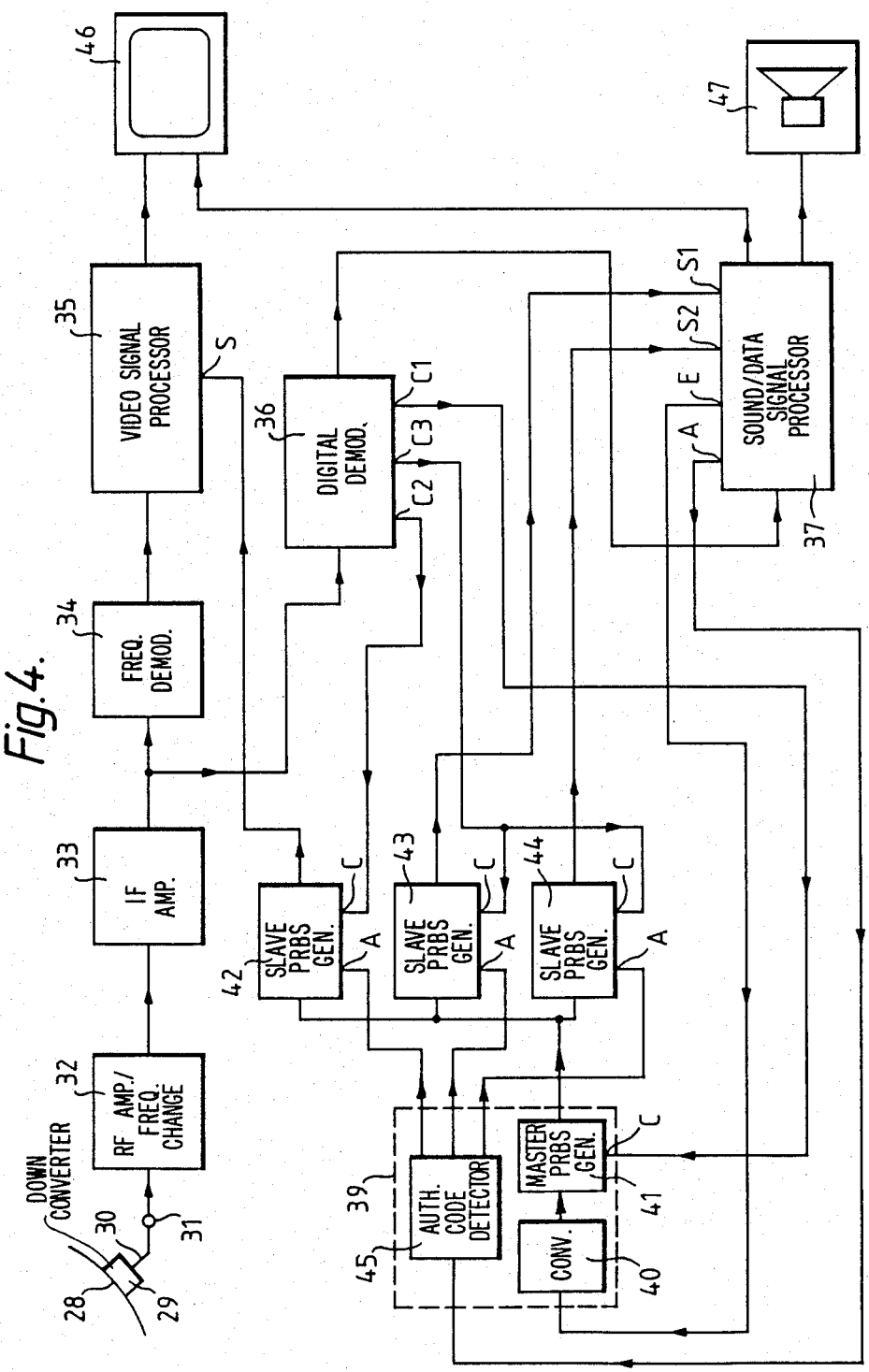

AUTHORISING CODED SIGNALS

This is a continuation of application Ser. No. 093,065, filed Aug. 31, 1987, now abandoned, which is a continuation of application Ser. No. 626,817, filed July 2, 1984, now abandoned.

BACKGROUND OF THE INVENTION

This invention relates to a system for authorizing a receiver to decode a scrambled signal in which an authorizing code is transmitted to said receiver. The invention also relates to a transmitter and a receiver for use with such a system. The invention in particular, though not exclusively, is concerned with authorizing television receivers to decode scrambled television signals.

For scrambled television transmissions, a number of proprosals have been made as to how subscribers may be authorized to view scrambled television signals on their television receivers. Such proposals have included the use of an active card which is introduced into the receiver together with a personal identification number (PIN) keyed in by the subscriber. One proposal that has been considered is that the authorization should be transmitted as a code from the television transmitter to the television receiver with each subscriber being allocated a unique authorization code, no action being required by the subscriber at the receiver. The time taken to sequentially transmit these individual authorization codes would be considerable. If it is assumed that a subscription television service has about 10,000,000 subscribers with each subscriber having an individual authorization code of (say) 50 bits transmitted at an effective data rate of 150 Kbits/second, then the time taken to sequentially transmit all the authorization codes would be on the order of one hour. This would mean that each subscriber wishing to receive a given (scrambled) program would have to have his television receiver energised, possibly in a stand-by condition, for at least an hour prior to the commencement of the programme which may not always be convenient. In addition, with such a long period taken to transmit all the authorization codes, it would not be possible to authorize the viewing of that program once transmission of that program had started.

SUMMARY OF THE INVENTION

It is an object of the present invention to migitate, if not overcome, the above difficulty.

The invention provides a system for authorizing a receiver to decode a transmitted scrambled signal in which an authorizing code is also transmitted, characterized in that the authorizing code comprises a multi-bit binary code word which is unique to a group of subscribers, this code word being followed by a train of binary pulses, the number of pulses in the train being not less than the number of subscribers in the group, each subscriber being allocated a unique pulse position in the pulse train, at which position, depending on the state of the pulse at that position, the subscriber's receiver is either authorized to decode or inhibited from decoding the scrambled signal. With this system, additional multi-bit binary code words may be provided, each of which is unique to a different group of subscribers, each additional code word being followed by an associated train of binary pulses, the number of pulses in the associated train being not less than the number of subscribers in the associated group, each subscriber of the associated group being allocated a unique pulse position in the associated pulse train, at which position, depending on the state of the pulse at that position, the subscriber's television receiver is either authorized to decode or inhibited from decoding the scrambled signal.

With the system according to the invention, for a similar number of subscriber's as given in the introduction, it is possible to transmit all the authorizing codes in a period of just over a minute which allows for the continuous transmission of these codes and authorization during the transmission of a scrambled signal.

The trains of binary pulses following the code words may not all be of the same length such that the pulse trains are not associated with the, same number of subscribers. The or each, code word may be followed by a binary key code which indicates the location of a further key code contained within the pulse train following the code word, the further key code either indicating the location of an additional key code in the pulse train or the location of the next code word.

If the scrambled signal, is a scrambled television signal the authorizing code may form part of the sound and/or data information accompanying the television signal.

The invention also provides a transmitter for use with the above system comprising means for providing a signal to be scrambled, means for scrambling the signal, means for applying said scrambled signal to a transmission medium, means for generating subscribers' authorization codes, and means for applying these authorization codes to the transmission medium, characterized in that the means for generating the authorization codes comprises means for generating a multi-bit binary code word which is unique to a group of subscribers, and for generating a train of binary pulses to follow this code word, the number of pulses in the pulse train being not less than the number of subscribers in the group, each pulse position in the pulse train being allocated to a respective subscriber in the group, and the condition of the pulse at each pulse position indicating whether or not the associated subscriber is authorized to receive the scrambled signal in an intelligible manner.

With such a transmitter, means may further be provided for generating additional multi-bit binary code words, each of which is unique to a different group of subscribers, and for generating additional trains of binary pulses, a different one of which follows a respective additional code word, the number of pulses in each additional pulse train being not less than the number of subscribers in the associated group, each pulse position in the additional pulse trains being allocated to a respective subscriber in the associated group and the condition of the pulse at each pulse position of each additional pulse train indicating whether or not the associated subscriber is authorized to receive the scrambled signal in an intelligible manner. It may also comprise means for generating binary key codes for insertion in the or each pulse train which key codes either indicate the location of a further key code or the location of the next code word.

If the signal is a television signal, then means may be provided for inserting the authorization codes into the sound and/or data information to accompany the television signal.

The invention further provides a receiver for use with the system as described above comprising means for receiving a scrambled signal, means for descrambling the scrambled signal, means for receiving a subscriber's authorization code and for authorizing the descrambling means to descramble the scrambled signal, characterized in that the means for receiving the subscriber's authorization code comprises means for receiving a transmitted code word (or code words) and (its or their) pulse train (or trains), means for interrogating the code (word or words) to determine the presence of the code word associated with the group in which the receiver's subscriber is a part, means for interrogating the pulse train following the associated code word to determine whether the condition of the pulse at the pulse position in this pulse train allocated to the subscriber authorizes said subscriber to receive said scrambled signal in an intelligible manner, and means for enabling said descrambling means should the subscriber be so authorised.

If the signal is a television signal, then the means for receiving the subscriber's authorization code may additionally comprise means for separating the authorization code from the sound and/or data information accompanying the television signal.

DESCRIPTION OF THE DRAWINGS

The above and other features of the invention will now be described, by way of example, with reference to the accompanying drawings, in which:

FIGS. 2 and 3 are diagrams of codes for use with the present invention; and

FIG. 4 is a block diagram of a receiver for use with the present invention.

DESCRIPTION OF THE PREFERRED EMBODIMENT

Figure 1:
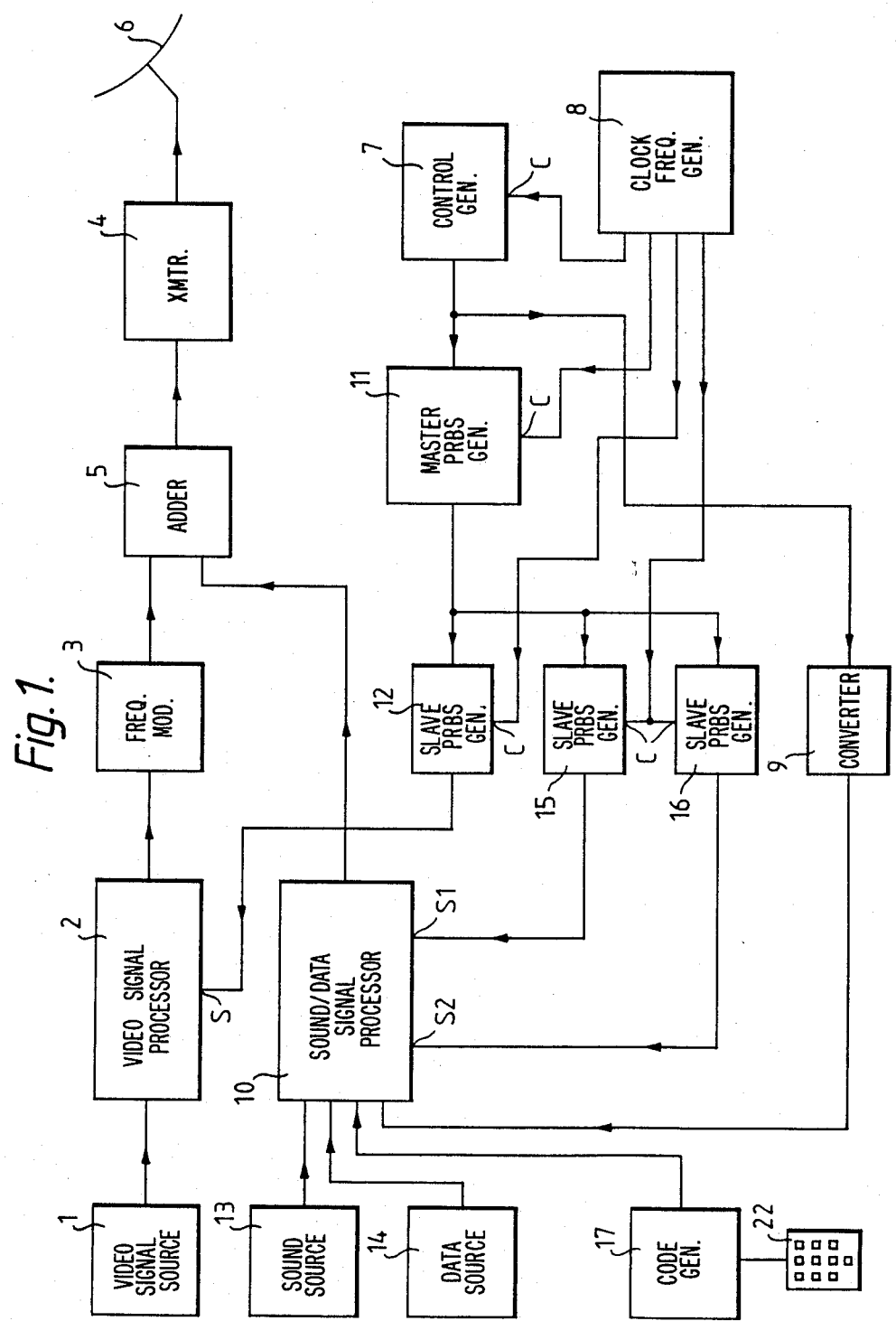
FIG. 1 is a block diagram of a transmitter for use with the present invention.

FIG. 1 shows a block diagram of a television transmitter for use with a direct broadcast satellite television transmission system and, in the case of FIG. 1, it is assumed that the system used is the C-MAC system along the lines disclosed in the Independent Broadcasting Authorities Experimental Development Report 118/82, entitled "MAC - A Television System for High-Quality Satellite Broadcasting", dated August 1982, pages 6 to 9, disclosing a C-MAC system, each television line of which sequentially contains a period of digital sound/data information, a period of compressed chrominance information and a period of compressed luminance information. Each television line is effectively divided into 1296 sample periods at a sampling rate of 20.25M bits/second, and page 7 therein contains a table indicating the number of samples alloted to each component. Since the publication of the above report, the number of samples alloted to the various components has been amended, but this is not important for an understanding of the present invention.

In FIG. 1 a video signal source 1, which may be a television camera or a video tape recorder, has its output connected to a video signal processor 2 in which, for the C-MAC system, the chrominance and luminance components will be compressed in the known manner. In addition, if the video signal is to be scrambled, the scrambling of the video components will also take place in the video signal processor 2. One suitable method of scrambling the vision components is known as "line cut" in which the chrominance and luminance components for each television line are each cut at a certain position such that each component is divided, and the positions of the divided components are transposed such that the latter part of a component (that part after the cut) appears before the first part of that component. The cut will not be at the same place in each line but may be made at any one of a possible 256 positions. A scrambling key will then be required which is the same at the transmitter and the receiver to provide the necessary information as to where the cut actually takes place, and such a key for a possible 256 cut positions per line will need to be an 8-bit binary word per television line. In FIG. 1, such an 8-bit word is applied to the input S of the video signal processor 2.

The output from the video signal processor 2 is applied to a frequency modulator 3 and the modulated output therefrom is applied to a suitable transmitter 44 via an adder circuit 5, the transmitter producing a modulated output in the 12 GHz band from which it will be applied to a suitable aerial system 6 from which it can be beamed-up to the satellite. In order to generate the necessary scrambling key for the scrambling of the video signal, a random control signal is generated by a control generator 7, which control signal is also required in the receiver, the rate at which the control signal is generated being controlled by clock pulses received at an input C from a clock frequency generator 8, which produces clock pulses at this and other frequencies. The control signal from control generator 7 is applied to a converter stage 9 where the control signal is encrypted according to the Data Encryption Standard to produce an encryption key containing 64 bits. This encryption key is applied to an input of a sound/data signal processor 10, where the encryption key is inserted either once per second or once every two seconds in the sound/data components of the C-MAC signal. The 2–4 PSK modulated output of the sound/data signal processor 10 is applied to a second input of the adder circuit 5 for addition to the video components prior to transmission.

The control signal from the control generator 7 is also applied to a master pseudo random binary sequence (PRBS) generator 11 which is a highly secure pseudo random generator according to the Data Encryption Standard, producing an output sequence of bytes at a rate of one byte per television frame, each byte having a pseudo random configuration of 64 bits. The master PRBS generator 11 is set either once per second or once every two seconds by the control signal from the control generator 7, to a particular pulse configuration with the output sequence thereafter being stepped in accordance with its random configuration. Clock signals of frequency 1.6 KHz are applied to the clock input C of the master PRBS generator 11 from the generator 8. The output of the master PRBS generator 11 is at the frame rate and is applied to a slave pseudo random bit sequence generator 12 for the video signal, which may also be of a highly secure type and producing one byte of 8 bits per television line. The output of the video slave PRBS generator 12 is applied to the input S of the video signal processor 2 and forms the scrambling key for scrambling the video signal. The output of the video slave PRBS generator 12 has a pseudo random configuration which is set once per frame to a particular pulse configuration by the output of the master PRBS generator 11, whereafter the video slave PRBS generator 12 output is stepped in accordance with its random configuration. A clock signal of 125 KHz is derived from an output of the clock frequency generator 8 and applied to the clock input C of the video slave PRBS generator 12.

Sources of sound and/or data signals 13 and 14 are also applied to the sound/data signal processor 10, the sound/data signal processor 10 processing the various inputs into a suitable form depending on the type of system used with the transmission. The sound/data channels may be assembled in a structure map system or may be packet multiplexed. These sound and data signals may also be scrambled to prevent unauthorized reception, and a suitable scrambling technique which can be used with the digital sound/data channels is that where the unscrambled digital signal is added to a pseudo random sequence by means of an exclusive OR-gate. In order to provide the required scrambling keys, the output of the master PRBS generator 11 is applied to respective sound/data slave pseudo random binary sequence generators 15 and 16, which may be of a similar type as that of the video slave PRBS generator 12, but the rate at which they produce their pseudo random configurations will depend upon the nature of the signals being processed in the sound/data signal processor 10, to inputs S1 and S2 of which the respective outputs of the slave PRBS generators 15 and 16 are applied as respective scrambling keys for the sound/data channels. As with the video slave PRBS generator 12, the sound/data slave PRBS generators 15 and 16 are periodically set at the frame rate by the output of the master PRBS generator 11. The sound/data slave PRBS generators 15 and 16 also receive pulse trains of a clock frequency at their clock inputs C from an output of the generator 8, the clock frequency being dependent on the rate at which the scrambling keys are to be produced.

The transmitter of FIG. 1 is additionally provided with a code generator 17 which generates, in code form, the authorizing codes required by subscribers at their receivers to authorize such receivers to descramble a scrambled television signal. As explained in the introduction, a current proposal is to transmit a completely unique authorizing code to each subscriber, but this would require a considerable period of time for the transmission of all such codes. With the present invention, the authorizing code takes a different form which allows the period of time required for transmission to be much shorter than with the above prior art proposal. The form the authorizing code takes is of a multi-bit binary code word which is unique to a group of subscribers, which code word is followed by a train of binary pulses the number of these pulses, being at least equal to the number of subscribers in the group. Each subscriber is allocated a unique pulse position, or time slot, in the pulse train which, together with the code word, provides the authorization (or otherwise) for the subscriber's receiver to descramble a scrambled television signal.

FIG. 2 shows a first form of the output of the code generator 17 which comprises a first group identification number (GIN 1) 18 which is the multi-bit binary code word (typically 50 bits) unique to a first group of, for example 1000 subscribers. This is followed by a train of binary pulses 19', 19'' which, for the number of given subscribers, must contain at least 1000 such pulses forming at least 1000 time slots. Each subscriber for the group identified by GIN 1 is allocated a unique pulse position, or time slot, in the pulse train 19', 19'' which, together with GIN 1, provides the required authorization, or otherwise. The condition of the pulse train at the appropriate time slot will determine whether a subscriber, who is allocated that time slot, will be able to obtain descrambled television signals. The expanded portions of 19' and 19'' show plurality of numbered pulse positions and the pulse condition at those positions. Some subscribers will be authorized when their pulse position is in a '1' condition and others when their pulse position is in a '0' condition. The opposite condition will provide a prohibition.

FIG. 2 also shows a second group identification number (GIN 2) 20 of similar composition to that of GIN 1 but being unique to a second group of subscribers and this is followed by a further train of binary pulses 21', 21'' which for the second group of subscribers (say 1000) contains at least 1000 pulses, or time slots, for a similar reason as pulse train 19', 19''. This may be followed alternately by further group identification numbers and further pulse trains for further groups of subscribers until sufficient authorization positions have been provided to cover the total number of subscribers. The group identification numbers will preferably contain error protection in some known manner.

Whether or not a subscriber is to be authorized will have to be conveyed to the code generator 17 and this is shown diagrammatically by the key pad 22 in FIG. 1. The serial group identification numbers and pulse trains are applied from the code generator 17 to an input of the sound/data signal processor 10, where they are assembled into the sound/data signal with the other sound and data channels, the method depending on the structure of the transmitted sound/data information.

If it is again assumed that a subscription television service would have about 10,000,000 subscribers, then with the present system, using a 50 bit group identification code for each 1000 subscribers, it will be necessary to have 10,000 such codes with a corresponding number of 1000 bit pulse trains. If these are then transmitted at an effective data rate of 150 Kbits/second, then the time taken to transmit authorization for all 10,000,000 subscribers would be slightly longer than a minute, which is considerably less than the time for the proposal in the introduction. With the present system, it would therefore be possible to repeat the authorizations continuously during a program which requires such authorization and does not require television receivers to be at least partly energized for a long period before such a program.

In the above description with respect to FIG. 2, the length of the pulse trains 19', 19''; 20', 20'', etc., following the group identification numbers are the same. The system may be made more secure if these pulse trains are made of different lengths and therefore serve different numbers of subscribers. The security of the system can be further improved by the introduction of key codes as shown in FIG. 3. In FIG. 3 the GIN 1 18 is immediately followed by a first key code (K1) 23 which signals the position, or period, when a second key code (K2) 24 commences. Between these two key codes part of the pulse train 19' is transmitted. This second key code (K2) indicates the start of a third key code (K3) 25 which, in turn, indicates the start of GIN 2 20 with further parts of the pulse train 19'', 19''' being present between these key codes and GIN 2 20. Similarly, GIN 2 20 is immediately followed by a fourth key code (K4) 26 which indicates the position of a further key code (K5) 27, the pulse train 21', 21'' being divided by this latter key code. The key codes need not be evenly spaced nor does the number of key codes have to be the same between each GIN.

FIG. 4 shows a television receiver for receiving signals from a C-MAC transmission and where the reference 28 indicates a dish aerial suitable for receiving satellite television signals in the 12 GHz band, the aerial having a down converter 29 attached to it which frequency converts the incoming television signal to a frequency within the 1 to 2 GHz band, depending, of course, on the frequency of the incoming signal. The down converted signal is applied over a co-axial cable 30 to a terminal 31 forming the input for the television receiver, this terminal 31 being connected to an r.f. amplifier and frequency changer stage 32 which amplifies and transforms the incoming signal to a suitable i.f. frequency of, for example 134 MHz, which is further amplified by an i.f. amplifier 33. The output of the amplifier 33 is applied to a frequency demodulator 34, since the video components of the broadcast satellite television signal are frequency modulated, the demodulated output of the demodulator 34 being applied to a video signal processor 35, in which the compressed chrominance and luminance components are processed such that they are expanded to occupy a line period and are available simultaneously. Under certain circumstances, video signals received by the aerial 28 will be scrambled (such as by the above "line cut" method) so as to permit only authorized subscribers to receive, in an intelligible manner, the incoming signals, in which case, the vision signal processor 35 will need to incorporate a de-scrambling stage in which the scrambled vision components are restored to their normal state. A scrambling key will then be required, which is the same at the receiver as at the transmitter, to enable descrambling of the scrambled video signal, and which is an 8 bit binary word per television line which is applied to the input S of the video signal processor 35.

The output of the i.f. amplifier 33 is also applied to a digital demodulator stage 36 where the incoming digital signals, which are 2-4 PSK modulated, are converted to normal binary form and from which synchronizing information and various clock frequencies are produced. The binary signal output from the demodulator stage 36 is applied to a sound/data signal processor 37, in which the various sound and data channels transmitted with the C-MAC signal are separated one from the other and further processed. As in the case with the video signal, some or all of the sound/data channels may also be scrambled to prevent unauthorized reception of this information and, again, it will be necessary to provide a scrambling key, or keys, for these sound/data channels to ensure their de-scrambling.

In order to reproduce the various scrambling keys required in the receiver, the slow rate coded encryption key, transmitted preferably with the sound/data components of the broadcast television signal, are also received by the aerial 28, at the suitable rate of one byte per second or one byte every two seconds with each byte containing, for example, 64 bits according to the Data Encryption Standard (D.E.S.). This coded encryption key is, separated from the incoming digital information by the sound/data signal processor 37 and appears at an output E for application to a sub-system 39 which may be in the form of a plastic card (of a similar size to a credit card) which the subscriber obtains and which is inserted into an appropriate aperture in the television receiver, which aperture contains suitable connections which make contact with corresponding contacts on the card. The card itself may house an integrated circuit (or circuits) which contain a converter 40, which provides the inverse of the D.E.S. algorithm to provide a de-encrypted trigger for a master pseudo random (PRBS) generator 41. The master PRBS generator 41 is of the same type and produces the same pseudo random output as the corresponding master PRBS generator 11 in the transmitter and which is set at the same time as that in the transmitter to the same particular pulse configuration. In addition, it will be necessary to provide clocking pulses for the master PRBS 41 at the appropriate frequency of 1.6 KHz, which clocking pulses are obtained from an output C1 of the demodulator stage 36 and applied to a clock input C of the master PRBS generator 41. In this way, data being transferred between the television receiver and the master PRBS generator 41 on the sub-system 39 are at suitable low rates, which rates are substantially lower than the sampling rate of 20.25M bits/second of the C-MAC system or the sound/data rate for one channel (325Kbits/second). The output from the master PRBS generator 41 is applied to a slave pseudo random bit sequence generator 42 for the video signal, which may also be of a highly secure type and producing one byte of 8 bits per television line. The output of the video slave PRBS generator 42 is applied to the input S of the video signal processor 35 and forms the scrambling key for the scrambled video signal. The output of the video slave PRBS generator 42 has a pseudo random configuration which is set once per frame to a particular pulse configuration by the output of the master PRBS generator 41, whereafter the video slave PRBS generator 42 output is stepped in accordance with its random configuration. A clock signal of 125 KHz is derived from an output C2 of the demodulator stage 36 and applied to the clock input C of the video slave PRBS generator 42.

The output of the master PRBS generator 41 is also applied to a number of slave pseudo random pulse sequence generators for the sound and data channels (sound/data PRBS) depending on the number of such channels subjected to scrambling. In FIG. 4, two such sound/data slave PRBS generators are shown indicated by the reference 43 and 44 and which are, respectively, associated with a sound or data channel. The slave PRBS generators 43 and 44 may be of a similar type to that of the video slave PRBS generator 42, but the rate at which they produce their pseudo random configuration will depend upon the nature of the signals being processed in the sound/data signal processor 37, to inputs S1 and S2 of which the respective outputs of the slave PRBS generators 43 and 44 are applied as respective scrambling keys for the sound/data channels. As with the video slave PRBS generator 42, the sound/data slave PRBS generators 4 are periodically set, at the frame rate, by the output of the master PRBS generator 41. The sound/data slave PRBS generators 43 and 44 also receive pulse trains of a clock frequency at their clock inputs C from an output C3 of the demodulator stage 36, the clock frequency being dependent on the rate at which the scrambling keys are to be produced.

The sub-system 39 also contains an authorization code detector 45, an input of which is connected to an output A of the sound/data signal processor 37, which output A produces the reconstructed authorization signals from the incoming sound/data information, and which may be in one of the forms described above in relation to FIGS. 2 and 3. The code detector 45 input receives the sequences of group identification numbers and pulse trains of authorization bits, interrogates these and produces an authorizing output when the coded detector 45 recognizes coincidence with its allocated group identification number and its time slot provided in the following binary pulse train. If more than one scrambled signal is to be authorized then more that one group identification number and time slot might be allocated to the code detector 45 to produce a number of auhorizing outputs at the same or different times. The authorizing outputs are applied to authorizing inputs A of the slave PRBS generators 42, 43 and 44 and only allow the generation of the respective scrambling key when such an input is present.

The output of the video signal processor 35 is shown in FIG. 4 to be applied to a display arrangement 46, where the expanded and de-scrambled video components are employed to produce a television display. An output of the sound/data signal processor 37 is shown connected to a loud-speaker system 47 where the appropriate sound channel is reproduced, while a further output of this processor 37 is shown applied to the display 46 for the display of data material, such as teletext.

In the above description of both a transmitter and receiver, a particular manner has been described for the generation of the various scrambling keys. It will, however, be realized that other known or proposed methods for producing such keys may also be used. The invention is also not limited to use with a MAC television system and may be used with other information systems.

I claim:

1. A system for authorizing decoding of a transmitted scrambled signal by a plurality of receivers belonging to a select group of subscribers, upon reception by said receivers of an authorizing code transmitted with said scrambled signal,
characterized in that said authorizing code comprises:
(a) a multibit codeword portion representing said group of subscribers; and
(b) a binary pulse train portion comprising a number of pulses not less than the total number of said subscribers wherein each pulse has a position within said pulse train which corresponds to one of said subscribers, each pulse having a first state and a second state,
wherein the receiver of a respective subscriber is authorized to decode said transmitted scrambled signal when said authorizing code is received and said pulse corresponding to said respective subscriber is in said first state, and said receiver of said respective subscriber is inhibited from receiving said transmitted scrambled signal when said authorizing code is received and said pulse is in said second state.

2. A system as claimed in claim 1, characterized in that additional multi-bit binary code words are employed, each of which is unique to a different group of subscribers, each additional code word being followed by an associated train of binary pulses, the number of pulses in the associated train being not less than the number of subscribers in the associated group, each subscriber of said associated group being allocated a unique pulse position in said associated pulse train, and depending on the state of the pulse at its allocated position, the subscriber's receiver is either authorized to decode or inhibited from decoding said scrambled signal.

3. A system as claimed in claim 2, characterized in that the trains of binary pulses following the code words are not all of the same length such taht the respective pulse trains are not associated with the same number of subscribers.

4. A system as claimed in claim 1, 2 or 3, characterized in that each code word is followed by a binary key code which indicates the location of a further key code contained within the pulse train following the code word, said further key code either indicating the location of an additional key code in said pulse train or the location of the next code, word.

5. A system as claimed in claim 1, characterized in that said code word or words and associated pulse trains are transmitted prior to the transmission of said scrambled signal.

6. A system as claimed in claim 1, characterized in that said code word or words and associated pulse trains are cyclically transmitted during the transmission of said scrambled signal.

7. A system as claimed in 1, in which said scrambled signal is a scrambled television signal, characterized in that said authorizing code forms part of the sound and/or data information accompanying said television signal.

8. A transmitter for transmitting a scrambled signal, comprising means for providing a signal to be scrambled, means for scrambling said signal, means for applying said scrambled signal to a transmission medium, means for generating subscribers' authorization codes, and means for applying said authorization codes to said transmission medium, characterized in that said means for generating said authorization codes comprises means for generating a multi-bit code word portion and a binary pulse train portion, the number of pulses in said pulse train portion being not less than the number of subscribers in the group, each pulse position in said pulse train portion being uniquely allocated to a respective subscriber in said group, and the state of the pulse at the allocated pulse position indicating whether or not the associated subscriber is authorized to receiver said scrambled signal in an intelligible manner.

9. A transmitter as claimed in claim 8, characterized in that said transmitter further comprises means for generating additional multi-bit binary code words each of which is unique to a different group of subscribers and for generating additional trains of binary pulses, a different one of which follows a respective additional code word, the number of pulses in each additional pulse train being not less than the number of subscribers in the associated group, each pulse position in said additional pulse trains being uniquely allocated to a respective subscriber in the associated group, and the condition of the pulse at the allocated pulse position of each additional pulse train indicating whether or not the associated subscriber is authorized to receive said scrambled signal in an intelligible manner.

10. A transmitter as claimed in claim 8 or 9, characterized in that said transmitter further comprises means for generating binary key codes for insertion in each pulse train, which key codes either indicate the location of a further key code or the location of the next code word.

11. A transmitter as claimed in claim 8 or 9, in which said signal is a television signal, characterized in that means are provided for inserting said authorization codes into the sound and/or data information to accompany the television signal.

12. A receiver for receiving scrambled signals transmitted by the transmitter as claimed in claim 8, comprising means for receiving a scrambled signal, means for descrambling said scrambled signal, means for receiving a subscriber's authorization code and for authorizing said descrambling means to descramble said scrambled signal, characterized in that said means for receiving said subscriber's authorization code comprises means for receiving a transmitted code word and its pulse train, means for interrogating the code word to determine the presence of the code word associated with the group of which the receiver's subscriber is a part, means for interrogating the pulse train following said associated code word to determine whether the condition of the pulse at the pulse position in said pulse train uniquely allocated to said subscriber authorizes said subscriber to receive said scrambled signal in an intelligible manner, and means for enabling said descrambling means should the subscriber be so authorized.

13. A receiver as claimed in claim 12, wherein key codes have been inserted into each pulse train, said key codes indicating the location of either a further key code or the next code word, characterized in that said means for interrogating said pulse train includes means for interrogating key codes in said pulse train to determine which key word is relevant to the pulse position allocated to said subscriber.

14. A receiver as claimed in claim 12 or 13, in which said signal is a television signal, characterized in that said means for receiving said subscriber's authorization code additionally comprises means for separating said authorization code from the sound and/or data information accompanying said television signal.

* * * * *